United States Patent
Wolff et al.

(10) Patent No.: US 10,151,609 B2
(45) Date of Patent: Dec. 11, 2018

(54) MAGNETIC INDUCTIVE FLOW MEASUREMENT DEVICE AND METHOD WITH REDUCED ELECTROCHEMICAL INTERFERENCE VOLTAGE

(71) Applicant: EICON GmbH, München (DE)

(72) Inventors: Marcus Wolff, Hamburg (DE); Henry Buhns, Seevetal (DE)

(73) Assignee: EICON GmbH, München (DE)

( * ) Notice: Subject to any disclaimer, the term of this patent is extended or adjusted under 35 U.S.C. 154(b) by 0 days.

(21) Appl. No.: 14/896,200

(22) PCT Filed: Jun. 4, 2014

(86) PCT No.: PCT/EP2014/061534
§ 371 (c)(1),
(2) Date: Dec. 4, 2015

(87) PCT Pub. No.: WO2014/195338
PCT Pub. Date: Dec. 11, 2014

(65) Prior Publication Data
US 2016/0116315 A1    Apr. 28, 2016

(30) Foreign Application Priority Data
Jun. 6, 2013    (DE) .......... 10 2013 105 832

(51) Int. Cl.
*G01F 1/58*    (2006.01)
*G01F 1/60*    (2006.01)

(52) U.S. Cl.
CPC ............... *G01F 1/584* (2013.01); *G01F 1/60* (2013.01)

(58) Field of Classification Search
CPC ........................................................ G01F 1/60
See application file for complete search history.

(56) References Cited

U.S. PATENT DOCUMENTS

| | | | |
|---|---|---|---|
| 3,530,713 A | 9/1970 | Nazareth, Jr. | 73/194 |
| 4,297,896 A * | 11/1981 | May | G01F 1/584 73/861.12 |
| 4,297,897 A * | 11/1981 | Young | G01F 1/584 73/861.12 |
| 4,357,835 A | 11/1982 | Kayama | 73/861.17 |
| 4,513,624 A * | 4/1985 | McHale | G01F 1/60 73/861.12 |
| 4,648,279 A * | 3/1987 | Milsch | G01F 1/60 73/861.17 |
| 5,206,588 A * | 4/1993 | Thorn | G01D 5/16 324/202 |

(Continued)

OTHER PUBLICATIONS

International Search Report dated Aug. 26, 2014, issued to the corresponding International application No. PCT/EP2014/061534.

*Primary Examiner* — Harshad R Patel
(74) *Attorney, Agent, or Firm* — Stein IP, LLC

(57) ABSTRACT

The invention relates to a measuring device for measuring a flow rate of an electrically conducting medium in a volume which is permeated by a magnetic field, comprising a device for producing the magnetic field, at least one resistor, at least two electrodes, the at least two electrodes being electrically interconnected via the at least one resistor, and an evaluation unit for evaluating the measurement signal of the electrodes measured in parallel to the at least one resistor, and for calculating the flow rate.

23 Claims, 1 Drawing Sheet

(56) References Cited

U.S. PATENT DOCUMENTS

| | | | | |
|---|---|---|---|---|
| 5,351,554 | A * | 10/1994 | Budmiger | G01F 1/60 73/861.16 |
| 6,431,011 | B1 * | 8/2002 | Feller | G01F 1/584 73/861.12 |
| 6,463,807 | B1 * | 10/2002 | Feller | G01F 1/584 73/861.12 |
| 6,571,642 | B1 | 6/2003 | Feller | 73/861.12 |
| 2009/0301218 | A1 * | 12/2009 | Budmiger | G01F 1/584 73/861.12 |
| 2014/0083200 | A1 * | 3/2014 | Rogers | G01F 1/588 73/861.12 |
| 2015/0300851 | A1 * | 10/2015 | Isik-Uppenkamp | G01F 1/584 73/861.12 |
| 2016/0161308 | A1 * | 6/2016 | Schoohf | G01F 1/58 73/861.12 |

\* cited by examiner

MAGNETIC INDUCTIVE FLOW MEASUREMENT DEVICE AND METHOD WITH REDUCED ELECTROCHEMICAL INTERFERENCE VOLTAGE

CROSS-REFERENCE TO RELATED APPLICATIONS

This application is a national stage of International Application No. PCT/EP2014/061534, filed Jun. 4, 2014, which claims the benefit of priority to German Application No. 10 2013 105 832.9, filed Jun. 6, 2013, in the German Patent Office, the disclosures of which are incorporated herein by reference.

The invention relates to a device for measuring a flow rate of an electrically conductive medium in a volume permeated by a magnetic field.

The measurement principle of magnetic inductive flow measuring devices is based on the law of electromagnetic induction (Faraday's law). The flowing fluid in a pipe in this case forms a moving electrical conductor (which presupposes at least low conductivity of the fluid). If the fluid flows through a magnetic field, two electrodes arranged perpendicular to the magnetic field can be used to measure an electrical voltage, the magnitude of which is proportional to the flow rate of the fluid.

In principle, interference voltages are superimposed on a measuring voltage. A proportion of the interference voltages can be attributed to electromagnetic radiation from the environment. This proportion can be reduced by means of suitable shielding of the measuring arrangement. A further interference voltage proportion is produced by electrochemical processes at the interface between the measuring electrodes and the fluid.

Redox reactions in which electrons are exchanged between the electrodes and the fluid occur at the interface between the electrodes and the fluid. Even if both electrodes consist of the same material and identical reactions therefore take place, they are not in chemical equilibrium in practice. The result is therefore different electrical potentials and therefore a voltage between the electrodes. The causes are, for example, the uneven number of atoms at the interfaces (for example as a result of differences with respect to the chemical purity or on account of geometrical differences), inhomogeneous impurities in the fluid or accumulations at the electrodes. The magnitude of the voltage changes continuously. The reason for these changes may be diffusion, convection, dissociation, ionization and friction, for example. As soon as the fluid starts to move, a DC voltage varies continuously since the charge distribution inside the fluid changes on account of flows and turbulence. At the same time, a voltage occurs at the electrodes as a result of the magnetic induction. This voltage is usually the actual measurement signal. If a voltage is applied to an electrode pair, the result is electrolysis and therefore an externally imposed exchange of electrons which is superimposed on the electrochemical voltage. These effects result in an (indefinitely) drifting variable voltage which is superimposed on the actual measurement signal as an offset.

U.S. Pat. No. 6,463,807 B1 discloses a method for magnetic inductive flow measurement, in which case a magnetic field is provided by a permanent magnet. A switch is provided in order to periodically short-circuit electrodes which are in contact with the medium to be measured.

The offset voltage can be eliminated by short-circuiting the electrodes for charge equalization. The magnetically induced useful signal is usually measured when the short circuit is removed. However, the electrochemical interference signal is established again immediately after the short circuit has been interrupted. As a result, this means a reduced accuracy of the measurement.

An object of the invention is to propose a measuring device and a corresponding method, in which case a satisfactory compromise is intended to be reached between a comparatively high measuring speed, on the one hand, and a comparatively good reduction in interference voltages (in particular electrochemical interference voltages), on the other hand.

In particular, the object is achieved by a measuring device for measuring a flow rate of an electrically conductive medium in a volume permeated by a magnetic field, comprising an apparatus for generating the magnetic field,
at least one electrical resistor,
at least two electrodes, the at least two electrodes being electrically (permanently) connected via the at least one electrical resistor, and
an evaluation unit for evaluating a measurement signal from the electrodes which is measured parallel to the at least one resistor and for calculating the flow rate.

A core idea of the invention involves implementing a (permanent) electrical connection between the electrodes via a resistor. As a result, charge equalization can continuously take place, with the result that a comparatively high measuring speed is enabled, on the one hand, and interference voltages, in particular electrochemical interference voltages, are reduced, on the other hand.

The medium is preferably guided in a corresponding line, in particular a pipe. Such a line, in particular such a pipe, may be part of the measuring device.

In one specific embodiment, the at least two electrodes are in direct contact with the flowing medium.

The measuring device preferably comprises at least one permanent magnet for generating the magnetic field. This makes it possible to further improve the measurement accuracy.

The (at least one) resistor preferably has a value of 10 to 200 kohm, preferably 40 to 60 kohm, more preferably 50 kohm. With such a resistor, a particularly good compromise is reached between a comparatively high measuring speed and a comparatively high measurement accuracy.

In one specific embodiment, a switch for providing a second electrical connection (in addition to the electrical resistor) for short-circuiting the at least two electrodes is provided, the second electrical connection being formed in addition and parallel to the first electrical connection (of the at least one electrical resistor). The switch in the open state preferably has a resistance of at least 10 Gohm, more preferably at least 100 Gohm. In addition, the switch in the closed state may have a resistance of at most 1 ohm, preferably at most 0.1 ohm and more preferably at most 10 mohm. A particularly high measurement accuracy is achieved by combining the switch with the (at least one) electrical resistor.

In one specific embodiment, the evaluation unit of the measuring device comprises a timer for controlling open and short-circuit times of the switch. The timer is preferably designed in such a manner that it short-circuits the switch for a first period and then opens the switch for a second period for measuring. The first period for short-circuiting may comprise 70 to 200 ms, preferably 60 to 100 ms, more preferably 80 ms. The second period may preferably comprise 1 to 40 ms, more preferably 10 to 30 ms, even more preferably 20 ms. As a result, a particularly good compromise is reached which allows a high measuring speed, on the one hand, and, in particular, greatly reduces the electrical interference voltages, on the other hand.

According to one specific embodiment, the measuring device may have a recording device which records the temporal profile of the measurement signal. The determination of the flow rate by the evaluation unit may be based on the fact that the temporal profiles of the voltage induced by the flow and of the electrochemical interference voltage differ. The evaluation unit may comprise a suitable measuring circuit, preferably a triggered sample-and-hold circuit, which preferably selectively records the proportion of the voltage induced by the flow. After the short circuit between the electrodes has been removed again by opening the switch, it takes some time for the magnetically induced useful voltage and the electrochemical interference voltage to have completely established themselves again. The time for the electrochemical processes is substantially dependent here on the reaction kinetics at the electrodes. In particular, if there are significant differences in the dynamic behavior between the two processes (for example if one voltage decays faster than the other), a suitable measuring circuit (for example a triggered sample-and-hold circuit) can be used to measure only the proportion of the induced voltage. This further improves the measurement accuracy.

A line (for example a pipe) which conducts the medium can be grounded. Grounding the line (the pipe) deliberately prevents the line (pipeline) from acting as an antenna. Interference voltages caused by radiation can be reduced (on account of sufficient shielding of the entire measuring system).

The measuring device preferably comprises a battery for providing an operating voltage. Such a battery makes it possible to completely dispense with a supply voltage (afflicted with interference voltage), if necessary. This further improves the measurement accuracy. The operating voltage is used to supply the measuring electronics and evaluation unit, in particular.

The electrodes may be produced, at least in sections and/or at least partially, from an inert material, preferably gold or platinum, or may be coated with an inert material, preferably gold or platinum. The electrodes may be produced, at least in sections and/or partially, from an electrically conductive polymer. Furthermore, the electrodes may be produced, at least in sections and/or at least partially, from an electrically conductive ceramic. Furthermore, the electrodes may be produced, at least in sections and/or at least partially, from carbon nanotubes. Inert electrode materials (such as gold or platinum) also have low electrochemical reactivity. Their use therefore further reduces the electrochemical offset. An electrode potential/redox potential (standard potential) which is as small as possible is preferred. Electrically conductive polymers and ceramics have similar advantages. On account of their structure, carbon nanotubes are also able to form porous, electrically conductive and mechanically stable networks. Overall, the electrochemical stability and thus the measurement accuracy are improved further.

The object may also be achieved by a measuring method for measuring a flow rate of an electrically conductive medium in a volume permeated by a magnetic field, in particular using the measuring device of the type described further above, comprising the steps of:
generating a magnetic field,
providing at least two electrodes which are permanently electrically connected via at least one resistor,
measuring a measurement signal parallel to the at least one electrical resistor,
evaluating the measured measurement signal in order to determine the flow rate.

The at least two electrodes are preferably in direct contact with the electrically conductive medium. The magnetic field is preferably generated by permanent magnets. The at least two electrodes may be connected, in addition and parallel to the permanent resistor connection, to a switch which is designed to short-circuit the electrodes. The switch in the open state may have a resistance of at least 10 Gohm. Furthermore, the switch in the switched-on state may preferably have a resistance of at most 1 ohm, preferably at most 0.1 ohm, particularly preferably at most 10 mohm.

The open and short-circuit times of the switch may be controlled. The switch is preferably short-circuited for a first period and is then opened for a second period for measuring. The first period is more preferably 40 to 200 ms, preferably 60 to 100 ms, more preferably 80 ms. The second period is preferably 1 to 40 ms, more preferably 10 to 30 ms, even more preferably 20 ms.

In one preferred embodiment, the temporal profile of the measurement signal is recorded. The determination of the flow rate may be based on the fact that the temporal profiles of the voltage induced by the flow and of the electrochemical control voltage differ.

A line (for example a pipe) which conducts the medium may be grounded.

A battery for providing an operating voltage (for supplying the measuring electrode and the evaluation electrode) may be provided.

The electrodes may be produced, at least in sections and/or partially, from a grounded material, preferably gold or platinum, or may be coated with said material and/or may be produced from an electrically conductive polymer and/or may be produced from an electrically conductive ceramic and/or may be produced from carbon nanotubes.

Further embodiments emerge as set forth hereinbelow.

Further features and advantages of the invention are also described below using an exemplary embodiment which is explained in more detail using the following figures, in which:

In the following description, the same reference symbols are used for identical and identically acting parts.

FIG. 1 shows a schematic illustration of an embodiment of the measuring device for measuring the flow rate.

Figure 1:
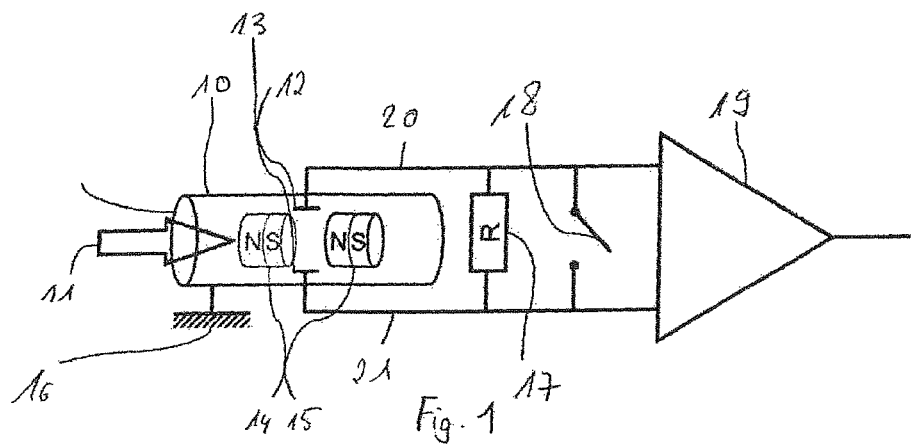
FIG. 1 shows a schematic illustration of a measuring device for measuring a flow rate of an electrically conductive medium.

An electrically conductive medium, the flow direction of which is indicated with the arrow 11, flows inside a pipeline 10. A first electrode 12 and a second electrode 13 which are opposite one another are also situated inside the measuring tube 10. An imaginary connecting line between the electrodes 12, 13 is perpendicular to the flow direction according to the arrow 11. A first magnet 14 and a second magnet 15 are also situated inside the measuring tube 10. An imaginary connecting line between the magnets 14, 15 is parallel to the flow direction according to the arrow 11. The pipeline 10 is connected to ground 16 and is therefore grounded. The electrodes 12, 13 are connected to one another via a resistor 17. The electrodes 12, 13 may also be connected via a switch 18 which can be connected in parallel with the resistor 17.

The reference symbol 19 is used to denote an amplifier which amplifies a measurement signal from the electrodes 12, 13.

The measurement signal from the electrodes 12, 13 (the measurement voltage of the electrodes 12, 13) is measured parallel to the resistor 17. The inputs of the amplifier 19 are also connected in parallel with the switch 18.

The electrodes 12, 13 are in contact with the medium flowing inside the in the pipeline 10. This results in charge separation and accumulation of positive particles and negative particles on the surfaces of the electrodes 12, 13 in the case of flowing medium. The electrodes 12, 13 are connected to the resistor 17, the switch 18 and the inputs of the amplifier 19 via supply lines 20, 21.

The switch 18 can be switched by a control unit (not shown) and a timer. The control unit may also control an evaluation unit (likewise not shown).

Figure 2:
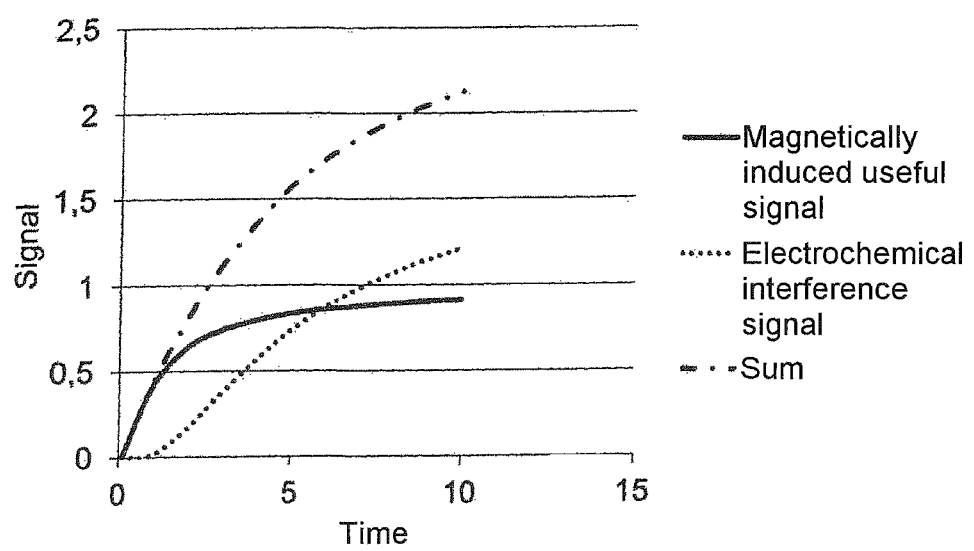
FIG. 2 shows a signal/time diagram.

FIG. 2 shows a typical profile of a magnetically induced useful signal, an electrochemical interference signal and the sum of the two signals.

As can be discerned, it takes some time for the magnetically induced useful voltage and the electrochemical control voltage to have completely established themselves again after the short circuit between the electrodes (at the time t=0) has been removed again by opening the switch. In this case, the time for the electrochemical processes is substantially dependent on the reaction kinetics at the electrodes. If there are now significant differences in the dynamic behavior between the two processes (for example one voltage builds up later than the other), an (optionally provided) suitable measuring circuit (for example a triggered sample-and-hold circuit) can be used to measure only the proportion of the induced voltage.

At this point, it is pointed out that all of the parts described above, alone and in any combination, again in particular the details illustrated in the drawings, are claimed as being essential to the invention. Changes to these are familiar to a person skilled in the art.

The invention claimed is:

1. A measuring device for measuring a flow rate of an electrically conductive medium inside a measuring tube and permeated by a magnetic field, comprising:
   at least one permanent magnet to generate the magnetic field;
   at least one electrical resistor;
   at least two electrodes situated inside the measuring tube and electrically connected to each other via the at least one electrical resistor and providing a measurement signal; and
   an evaluation unit to evaluate the measurement signal from the electrodes which is measured in parallel to the at least one resistor to calculate the flow rate.

2. The measuring device as claimed in claim 1, wherein the least one resistor has a value of 10 to 200 kohm.

3. The measuring device as claimed in claim 1, wherein the evaluation unit comprises a recording device which records a temporal profile of the measurement signal.

4. The measuring device as claimed in claim 3, wherein the evaluation of the flow rate by the evaluation unit is based on the fact that temporal profiles of voltage induced by the flow and of electrochemical interference voltage differ.

5. The measuring device as claimed in claim 4, wherein the evaluation unit comprises a measuring circuit which selectively records a proportion of the voltage induced by the flow to the recording device.

6. The measuring device as claimed in claim 1, wherein a line which conducts the medium is grounded.

7. The measuring device as claimed in claim 1, further comprising a battery to provide an operating voltage.

8. The measuring device as claimed in claim 1, wherein the electrodes are formed in at least one of sections and at least partially, from at least one of:
   an inert material or are coated with the material;
   an electrically conductive polymer;
   electrically conductive ceramic; and
   carbon nanotubes.

9. A measuring method to measure a flow rate of an electrically conductive medium in a volume permeated by a magnetic field, using the measuring device as claimed in claim 1, comprising:
   generating the magnetic field;
   measuring the measurement signal parallel to the at least one electrical resistor; and
   evaluating the measured measurement signal in order to determine the flow rate.

10. The measuring method as claimed in claim 9, wherein the at least two electrodes are in direct contact with the electrically conductive medium.

11. The measuring method as claimed in claim 9, wherein the magnetic field is generated by at least one permanent magnet.

12. The measuring method as claimed in claim 9, wherein:
   the at least two electrodes are connected, in addition and parallel to the resistor connection, to a switch which is designed to short-circuit the electrodes;
   the switch in the open state has a resistance of at least 10 Gohm; and/or
   the switch in the switched-on state has a resistance of at most 1 ohm.

13. The measuring method as claimed in claim 12, wherein:
   the open and short-circuit times of the switch are controlled; the switch is short-circuited for a first period and then opened for a second period for measuring, the first period comprising to 200 ms and the second period comprising 1 to 40 ms.

14. The measuring method as claimed in claim 13, further comprising recording a temporal profile of the measurement signal.

15. The measuring method as claimed in claim 14, the evaluating of the flow rate is based on the fact that temporal profiles of a voltage induced by the flow and of an electrochemical interference voltage differ.

16. The measuring method as claimed in claim 15, wherein a line which conducts the medium is grounded.

17. The measuring method as claimed in claim 16, further comprising providing an operating voltage using a battery.

18. The measuring method as claimed in claim 17, wherein the electrodes are formed in at least one of sections and partially, from at least one of:
   an inert material, or are coated with the material;
   an electrically conductive polymer;
   an electrically conductive ceramic; and carbon nanotubes.

19. The measuring device according to claim 1, wherein the at least one permanent magnet comprises a pair of permanent magnets positioned such that an imaginary line between the pair of permanent magnets is parallel to the flow direction.

20. The measuring device according to claim 1, wherein the at least one permanent magnet is situated in the measuring tube and comprises a pair of permanent magnets positioned such that an imaginary line between the pair of permanent magnets is parallel to the flow direction.

21. The measuring device according to claim 1, wherein the at least one resistor is a permanent resistor.

22. A measuring device for measuring a flow rate of an electrically conductive medium in a volume permeated by a magnetic field, comprising:
- at least one permanent magnet to generate the magnetic field;
- at least one electrical resistor;
- at least two electrodes electrically connected via the at least one electrical resistor; and
- an evaluation unit to evaluate a measurement signal from the electrodes and which is measured parallel to the at least one resistor to calculate the flow rate;
  - a switch to provide a second electrical connection to short-circuit the at least two electrodes, the second electrical connection being formed in addition and parallel to the first electrical connection of the at least one electrical resistor; wherein:
- the switch in at least one of:
  - the open state has a resistance of at least 10 Gohm; and
  - in the switched-on state has a resistance of at most 1 ohm.

23. The measuring device as claimed in claim 22, wherein the evaluation unit comprises a timer to control open and short-circuit times of the switch, wherein the timer short-circuits the switch for a first period of 40 to 200 ms and then opens the switch for a second period of 1 to 40 ms to measure.

* * * * *